Feb. 3, 1970  E. I. WATSON ET AL  3,493,252
BALL AND SOCKET JOINT
Filed May 17, 1967  7 Sheets-Sheet 1
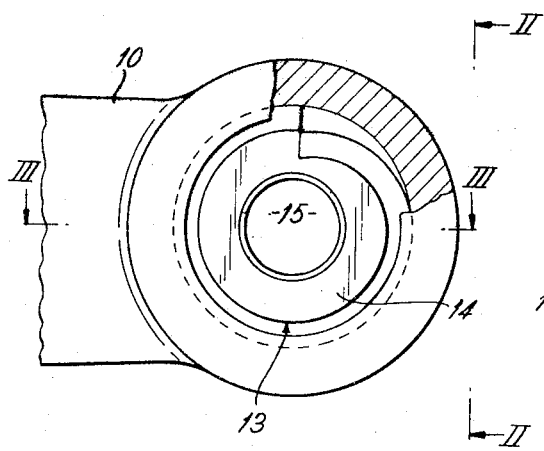
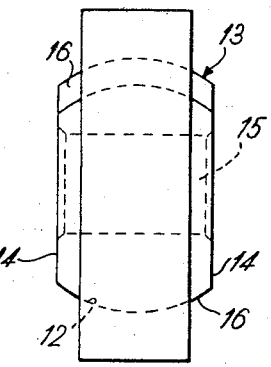
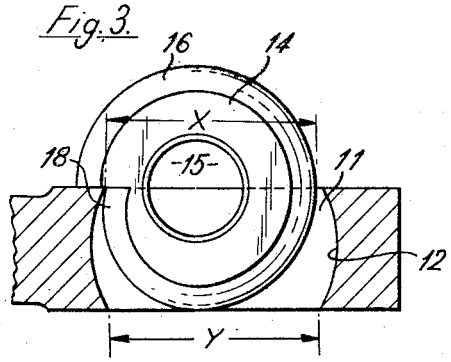
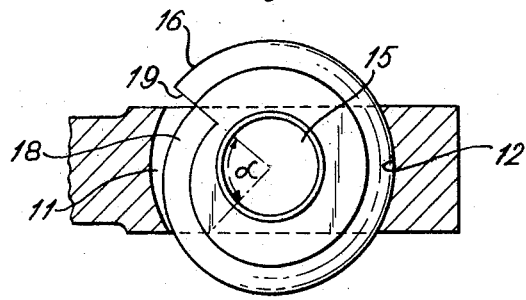
Inventors
ERIC I. WATSON
JAMES L. DEAN
BY Tweedale & Gerhardt
Attorneys

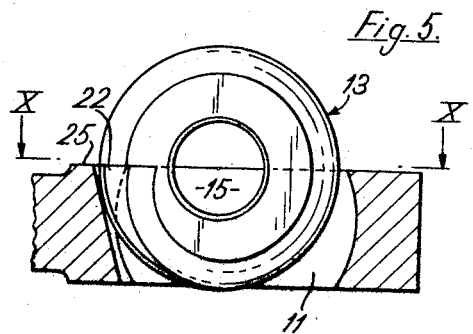
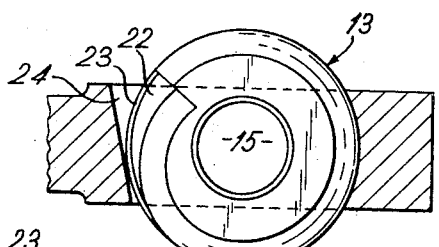
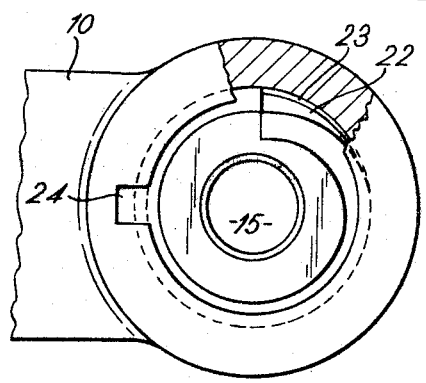
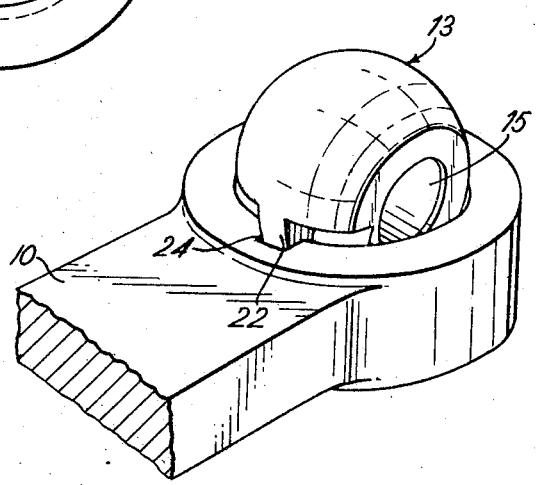

Feb. 3, 1970  E. I. WATSON ET AL  3,493,252
BALL AND SOCKET JOINT

Filed May 17, 1967  7 Sheets-Sheet 3

Inventors
ERIC I. WATSON
JAMES L. DEAN
BY Tweedale & Gerhardt
Attorneys

Inventors
ERIC I. WATSON
JAMES L. DEAN
BY Tweedale & Gerhardt
Attorneys

Feb. 3, 1970   E. I. WATSON ET AL   3,493,252
BALL AND SOCKET JOINT
Filed May 17, 1967   7 Sheets-Sheet 6
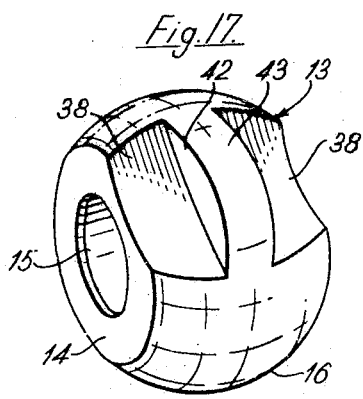
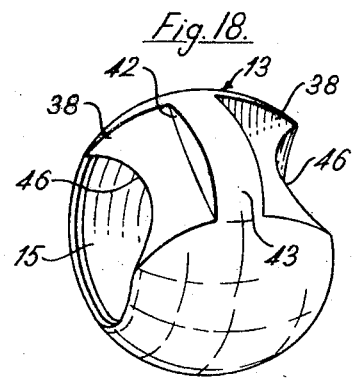
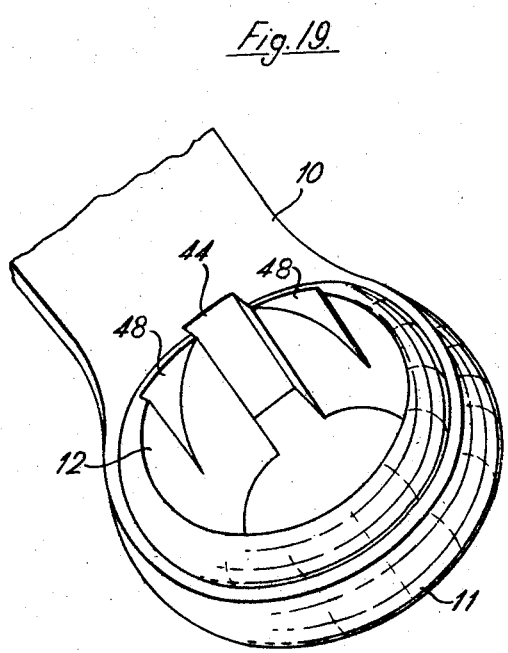
Inventors
ERIC I. WATSON
JAMES L. DEAN
BY Tweedale & Gerhardt
Attorneys Inventors
ERIC I. WATSON
JAMES L. DEAN
BY Tweedale & Gerhardt
Attorneys United States Patent Office 3,493,252
Patented Feb. 3, 1970

3,493,252
BALL AND SOCKET JOINT
Eric I. Watson, Solihull, and James L. Dean, Kenilworth, England, assignors to Massey-Ferguson Services, N.V., Curacao, Netherlands Antilles
Filed May 17, 1967, Ser. No. 639,239
Claims priority, application Great Britain, May 21, 1966, 22,769/66; Feb. 22, 1967, 8,343/67
Int. Cl. F16c *11/06;* F16b *7/00*
U.S. Cl. 287—88                                        6 Claims

ABSTRACT OF THE DISCLOSURE

The present invention relates to a ball and socket joint wherein the ball member has a central hole therethrough and part of the spherical surface thereof is cut away to provide a portion of gradually reduced radius terminating at a radial face so as to enable insertion of the ball into a complementary socket and prevent removal thereof when turned to another position in said socket.

---

The invention relates to ball and socket joints, especially, but not exclusively, for use in three-point hitch linkages of agricultural tractors.

Three standard sizes of tractor hitch linkage are in common use at present. These are known as categories 1, 2 and 3 respectively, and certain types of implements are generally constructed for connection to category 1 hitches, other types for connection to category 2 hitches and so on. Thus it is desirable that a tractor hitch linkage of one category should be capable of conversion to the other categories so that regardless of the category of its hitch, the tractor may be used with implements of other categories.

Accordingly, it is an object of the invention to provide means whereby a tractor hitch linkage may be converted from one category to another.

According to the invention, a ball having a central hole therethrough has a part of its outer spherical surface cut away to enable insertion of the ball into a complementary socket with the axis of said hole at right angles to its normal operative position in the socket. The spherical surface of the ball is cut away to provide a part of gradually reducing radius terminating at a generally radial face extending outwards to the normal radius part of the surface.

Alternatively, a segment of the spherical surface of the ball may be cut away to provide an arcuate depression in the spherical surface of the ball, or a circumferentially extending tongue having an outer spherical surface forming a continuation of the normal radius surface of the ball may be provided on the cut away part substantially midway between the ends of the hole.

The tractor link is provided with a groove in the socket for reception of the tongue when removing the ball.

In order that the invention may be more clearly understood embodiments will now be described, by way of example only, with reference to the accompanying drawings in which:

FIG. 1 is a side view partly in section of the rear end of a tractor lower link showing a ball according to one embodiment of the invention in operative position;

FIG. 2 is an end elevation in the line 2—2 of FIG. 1;

FIGS. 3 and 4 are part sectional views on the line 3—3 of FIG. 1, showing two stages in assembly of a ball into the link;

FIGS. 5, 6 and 7 are views similar to FIGS, 3, 4 and 1 respectively but showing a modified form of link and ball;

FIG. 8 is a perspective view of a ball and link according to FIGS. 5 to 7 in which the ball is being inserted into the link and is approximately in the position shown in FIG. 5;

FIGS. 17 and 18 are perspective views for different categories;

FIG. 19 is a perspective view of a further modified link;

Figure 9:
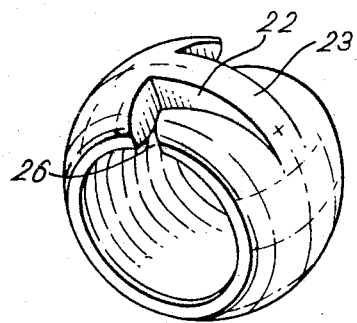
FIG. 9 is a perspective view of a link ball suitable for use in the embodiment shown in FIGS. 5 to 8.

Referring first to FIGS. 1, 2 and 3, these show the rear end of a tractor lower link 10 including a socket 11 with a spherical surface 12 in which a ball 13 is received. The ball in the conventional manner includes a pair of opposed parallel flats 14 normal to the axis of a hole 15 passing through the ball, and a spherical outer surface 16 of the same radius as the surface 12 so that the ball is universally mounted in the socket 11. Balls for different categories of hitch differ in the diameter of the hole 15 and in the distance between the flats 14, but they retain the same diameter for the spherical surfaces. Thus the only difference between different categories is in the details of the balls and the same links 10 are suitable for all categories.

As best shown in FIGS. 3 and 4 a part 18 of the spherical outer surface of each ball is cut away over an angle of approximately 90° to give a gradually decreasing distance from the center of the ball to the surface. The decreased radius surface terminates in a radial face 19 extending between the surface 18 and the normal radius surface 16. The depth cut away is such that "diameter" X (FIG. 3) composed of the sum of the lengths of the decreased radius and the normal radius is slightly less than the diameter Y of the entrance to the socket 11.

A ball of this shape may easily be placed in the socket 11 in the following manner. First the ball, with the axis of the hole 15 perpendicular to its normal working position is inserted into the socket, in the manner shown in FIG. 3, this being possible by virtue of the relationship between the dimenstions X and Y just mentioned. The ball is then rotated so that the surface 18, starting at its minimum radius, rolls along the surface 12 of the socket until the position shown in FIG. 4 is reached. The ball is now fully in the socket and all that is necessary to bring it into the working position is to rotate it until the hole 15 is in the position shown in FIGS. 1 and 2. Similarly the ball may easily be removed by a reverse operation.

It should be noted that the provision of the cut away part results in only a very small loss of bearing area so that the structure is not unduly weakened and furthermore since the ball must first attain a position similar to that in FIG. 3 where the face 19 overlaps the edge of the link it is unlikely to inadvertently fall out of the socket when no implement is attached to the links. When an implement is attached, the implement pins prevent movement of the balls into the position in which they can be removed from the sockets. Thus no retaining means is necessary.

In the embodiment shown in FIGS. 5 to 9 the ball is modified by the provision of a tongue 22 situated substantially centrally between the flats 14 and extending over the cut-away portion, the outer surface 23 of the tongue being part of the spherical surface of the ball. Also the link 10 is modified by the provision of a groove 24 extending from one face 25 of the link and dimensioned to accommodate the tongue.

In this form, as clearly shown in FIGS. 5, 6 and 8, the ball is assembled in the link in a similar manner to that for the previous example, but in this instance the tongue 22 enters the groove 24. However, once the FIG. 6 position is reached the tongue is free from the groove so that the ball is free for universal movement and may be rotated into its position of use.

The construction provides a larger bearing area than the form shown in FIGS. 1 to 4 because the surface 23 of the tongue in the position of use provides a further bearing area so that there is at least some bearing area completely round the ball. Additionally the risk of the ball inadvertently dropping out is further reduced since there is only one possible position, namely with the tongue 22 and groove 24 aligned, in which it can be removed from the socket. Additionally the groove 24 is provided on a horizontal diameter of the socket and the tongue, due to the unbalanced center of gravity of the ball, will tend to normally be in the upper position shown in FIG. 7.

Figure 11:
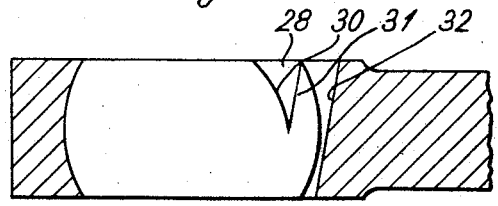
FIG. 11 is a section on the line 11—11 of FIG 10 with the ball removed.

The balls shown in FIGS. 8 and 9 are intended respectively for different category implements, the holes 15 being of different diameters and have a spherical outer diameter suitable for use with presently existing standard sized sockets 11 on the link ends. In the case of the large category 1 ball, however, the diameter of the hole 15 may be such that for satisfactory entry of the ball into the socket the cut-away portion 18 is of a size which causes a V-shaped part 26 of material to be cut-away. This under some conditions may not be acceptable and, while the difficulty can be overcome by increasing the ball diameter for both categories, this has the disadvantage that special links 10 are required. Accordingly to avoid this problem and still use balls which are suitable for use with existing standard sized links having a minimum of modification, the category 2 ball may not be cut away to the full depth required so that a completely circular face 14 is retained. A pair of recesses 28 are then cut into the socket, one on either side of the groove 24, to accommodate the extra part of the ball when inserting it in position. The recesses 28 taper into the link in a similar manner to the groove 24 and merge into the surface 12 along the line 30 (FIG. 11).

Both the recesses 28 and the groove 24 may have straight inner edges 31 and 32 respectively, so that they may be formed in a single machining operation, for example broaching.

In the embodiment shown in FIGS. 12 to 17, parts 38 of the spherical outer surface of the ball are cut away over an angle of between 60° and 90° to form a tongue 42 located substantially centrally between the flats 14 and extending over the cut-away portion, the outer surface 43 of the tongue being part of the spherical surface of the ball. The cut away parts have concave surfaces and flank the tongue 42. The depth cut away is such that "diameter" X (FIG. 16), composed of the sum of the lengths of the minimum radius at the cut-away parts and the normal radius, is slightly less than the diameter Y (FIG. 13) of the entrance to the socket 11.

A ball of this shape is inserted in the socket 11 in the same manner as the embodiment shown in FIGS. 1 to 4, various stages during insertion being shown in FIGS. 13 to 16. In common with the embodiment shown in FIGS. 5 to 8, the ball shown in FIG. 17 results in only a very small loss of bearing area and is unlikely to fall out of the socket 11 when no implement is attached to the links.

Figure 10:
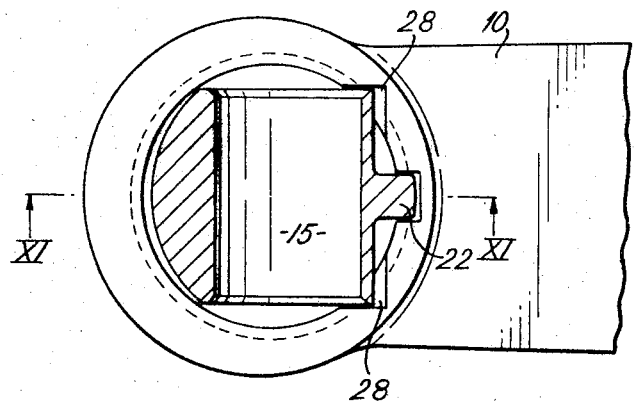
FIG. 10 is a sectional view in the line 10—10 of FIG. 5 and illustrating a further modification.
Figure 12:
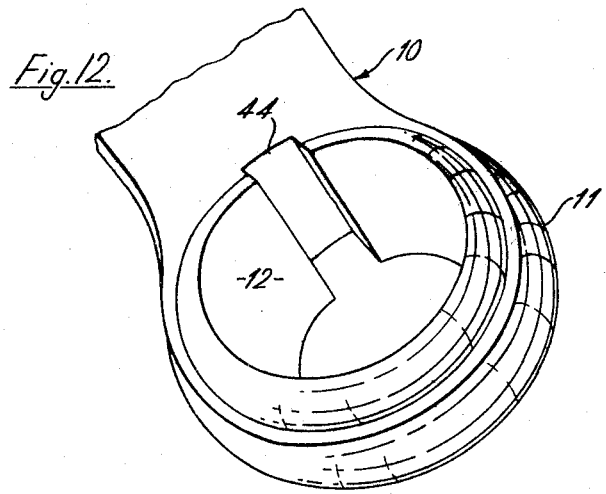
FIG. 12 is a perspective view of the rear end of a tractor lower link for use with a further modified ball.
Figure 13:
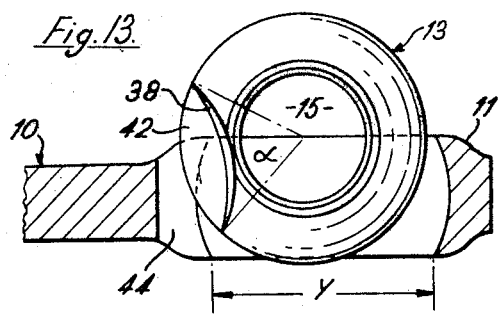
FIG. 13 is a part sectional view of the link of FIG. 12 and a ball showing one stage in assembly of the ball into the link.
Figure 14:
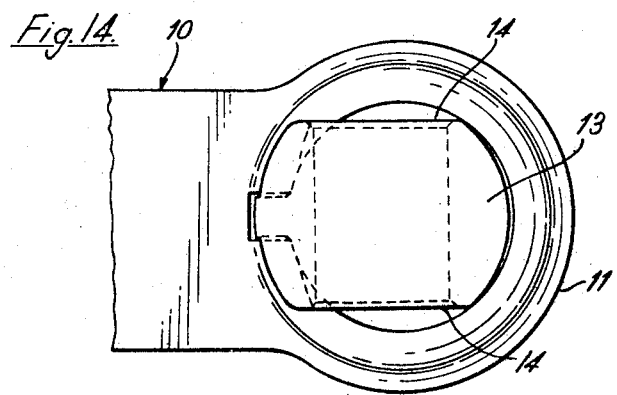
FIG. 14 is a side view of FIG. 13.
Figure 15:
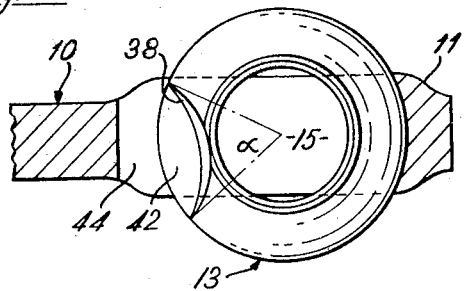
FIG. 15 is a view similar to FIG 13 showing another stage in assembly of the ball into the link.
Figure 16:
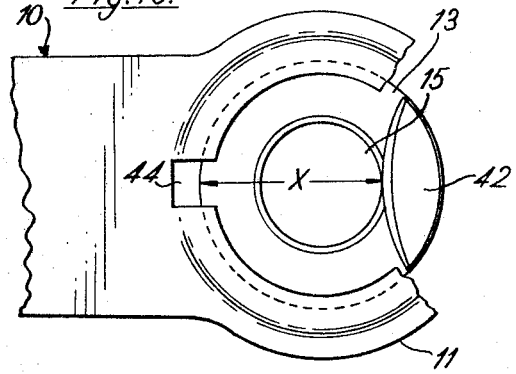
FIG. 16 is a side view, partly in section, showing the ball in operative position in the link.
Figure 20:
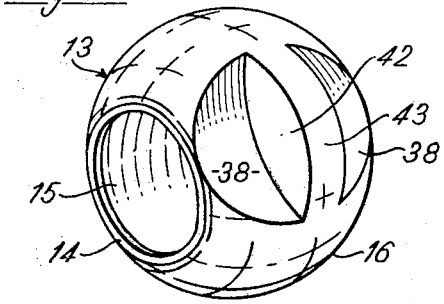
FIG. 20 is a perspective view of a ball for use in the link shown in FIG. 19.

FIGS. 17 and 18 show category 1 and 2 balls respectively for use with the socket of FIG. 12, the category 2 ball having an arcuate part of the material cut away at 46 due to the large size of the hole 15. As previously mentioned this may be undesirable in some circumstances and to overcome the problem the modified socket and ball shown in FIGS. 19 and 20 may be used. The arrangement is similar to that described with reference to FIGS. 10 and 11, the recesses on opposite sides of the main groove 44 being shown at 48.

In modifications of the arrangements shown in FIGS. 12 to 20 the tongue may be omitted altogether so that the cut-away portions 38 run together. In this case the groove 44 in the socket 11 may be omitted also.

Figure 21:
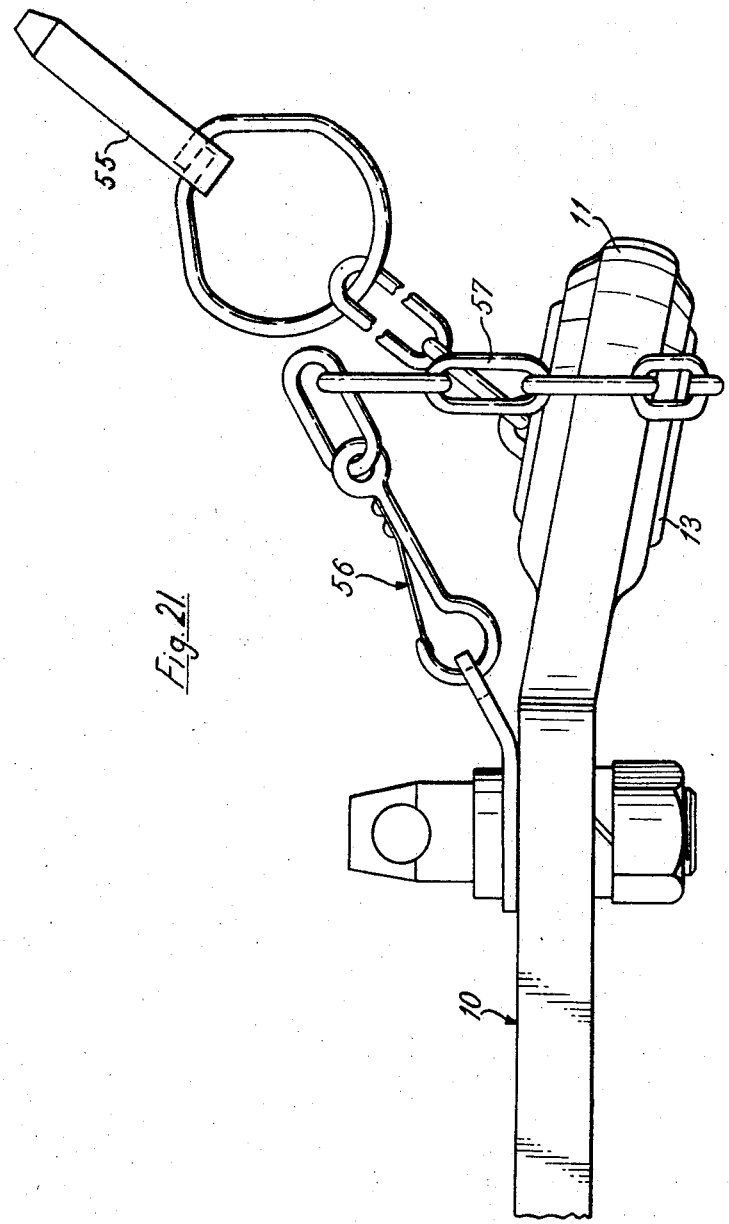
FIG. 21 shows an arrangement for preventing loss of balls when not in use.

FIG. 21 shows a safety arrangement to prevent loss of balls if the hitch is not being used. The usual link pin 55 is detachably connected to the draft link 10 by a clip 56 so that the chain 57 may be passed through the ball 13 and then clipped to the draft link, thereby preventing the ball from becoming detached and lost.

It will be apparent to those skilled in the art that the invention is not limited to the exact construction shown, but that other forms are possible, all falling within the scope and spirit of the invention.

We claim:

1. A ball adapted to be received within a socket, the ball having a central hole therethrough and part of the spherical surface of the ball being cut away to provide a part of gradually reducing radius terminating at a generally radial face extending outwards to the normal radius part of the surface, thus enabling insertion of the ball into a complementary socket with the axis of said hole at right angles to its normal operative position in the socket.

2. A ball according to claim 1 in which the cut away part of the spherical surface subtends an angle of approximately 90° at the axis of the hole.

3. A ball according to claim 1 in which a circumferentially extending tongue formed with an outer spherical surface forming a continuation of the normal radius surface of the ball is provided on the reduced radius part substantially midway between the ends of the hole.

4. The construction according to claim 3, further including a socket having a hole of circular cross-section passing therethrough, the inner peripheral wall of the hole being of spherical shape and of radius equal to the maximum radius of the ball, and a groove of gradually increasing depth formed in said wall and extending parallel to the axis of said hole for reception of the tongue on said ball.

5. A ball adapted to be received in a socket, the ball having a central hole therethrough, part of the spherical surface of the ball being cut away to provide an arcuate depression in the surface of the ball, the ball including a circumferentially extending tongue formed with the outer spherical surface as a continuation of the normal radius surface of the ball, the tongue being located on the depression substantially midway between the ends of the hole, the socket having a second hole of circular cross-section passing therethrough, the inner peripheral wall of the second hole being of spherical shape and of radius equal to the maximum radius of the ball, and a groove formed in the wall and extending parallel to the axis of the second hole for receiving the tongue, the depression, tongue and groove coacting to enable insertion of the ball into the socket with the axes of the holes at right angles to their normal operative positions.

6. The combination according to claim 5 further including a pair of recesses located one on either side of said groove for accommodation of portions of a ball during insertion of same into the socket.

References Cited

UNITED STATES PATENTS

| 1,266,061 | 5/1918 | Scoville. |
| 2,042,513 | 6/1936 | Daniell. |
| 3,007,747 | 11/1961 | Isler _____ 308—72 |
| 3,238,809 | 3/1966 | Beard _____ 280—460.1 XR |

CARL W. TOMLIN, Primary Examiner

ANDREW V. KUNDRAT, Assistant Examiner